United States Patent
Niwa

(10) Patent No.: US 10,886,791 B2
(45) Date of Patent: Jan. 5, 2021

(54) POWER RECEPTION DEVICE, POWER TRANSFER SYSTEM, AND CONTROL METHOD OF POWER RECEPTION DEVICE

(71) Applicant: Toyota Jidosha Kabushiki Kaisha, Toyota (JP)

(72) Inventor: Yamato Niwa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/597,143

(22) Filed: Oct. 9, 2019

(65) Prior Publication Data

US 2020/0119579 A1    Apr. 16, 2020

(30) Foreign Application Priority Data

Oct. 12, 2018    (JP) .................................. 2018-193404

(51) Int. Cl.

| H02J 50/80 | (2016.01) |
| H04B 5/00 | (2006.01) |
| H02J 50/60 | (2016.01) |
| B60L 3/04 | (2006.01) |
| H02J 50/10 | (2016.01) |
| H02J 7/00 | (2006.01) |
| B60L 53/124 | (2019.01) |

(Continued)

(52) U.S. Cl.
CPC ................ *H02J 50/80* (2016.02); *B60L 3/04* (2013.01); *B60L 53/122* (2019.02); *B60L 53/124* (2019.02); *B60L 53/38* (2019.02); *H02J 7/0029* (2013.01); *H02J 50/10* (2016.02); *H02J 50/60* (2016.02); *H02J 50/90* (2016.02); *H04B 5/0037* (2013.01); *Y02T 90/12* (2013.01); *Y02T 90/14* (2013.01)

(58) Field of Classification Search
CPC .. H02J 50/80; H02J 7/025; H02J 50/12; H02J 5/005; H02J 50/10; H02J 7/0029; H02J 50/60; H02J 50/90; B60L 53/12; B60L 53/122; B60L 53/124; B60L 53/126; B60L 53/62; Y02T 90/12
See application file for complete search history.

(56) References Cited

U.S. PATENT DOCUMENTS 10,505,362 B2 * 12/2019 Misawa ................ H02J 7/0029

FOREIGN PATENT DOCUMENTS

| JP | 2014-050271 A | 3/2014 |
| JP | 2016-082877 A | 5/2016 |
| WO | 2014034966 A1 | 3/2014 |

* cited by examiner

*Primary Examiner* — Ryan Johnson
(74) *Attorney, Agent, or Firm* — Dinsmore & Shohl LLP

(57) ABSTRACT

The power reception device includes a power reception unit configured to receive power from a power transmission unit, a power storage device, a charging relay provided between the power reception unit and the power storage device, and a controller. The controller executes a first fail-safe control when a malfunction is detected during external charging in which the charging relay is switched to the ON state. In the first fail-safe control, an output power of the power transmission unit is reduced lower than a target value with the charging relay being maintained at the ON state, the output power is restored to the target value if the malfunction is solved before a standby time has passed, and the charging relay is switched to the OFF state so as to stop the external charging if the malfunction is not solved after the standby time has passed.

7 Claims, 5 Drawing Sheets

(51) Int. Cl.
*H02J 50/90* (2016.01)
*B60L 53/122* (2019.01)
*B60L 53/38* (2019.01)

| CLASSIFICATION OF MALFUNCTION | TYPE OF MALFUNCTION | FS CONTROL TO BE PERFORMED | STANDBY TIME TB |
|---|---|---|---|
| FIRST MALFUNCTION | INTERRUPTION OF WIRELESS COMMUNICATION | FIRST FS CONTROL | T2(T2<T1) |
| | INTRUSION OF FOREIGN OBJECT | | T1 |
| SECOND MALFUNCTION | UNIT FAILURE | SECOND FS CONTROL | NONE |
| | UNIT OVERHEAT | | |
| | DETECTION OF FOREIGN OBJECT | | |
| | POSITION MISALIGNMENT | | |

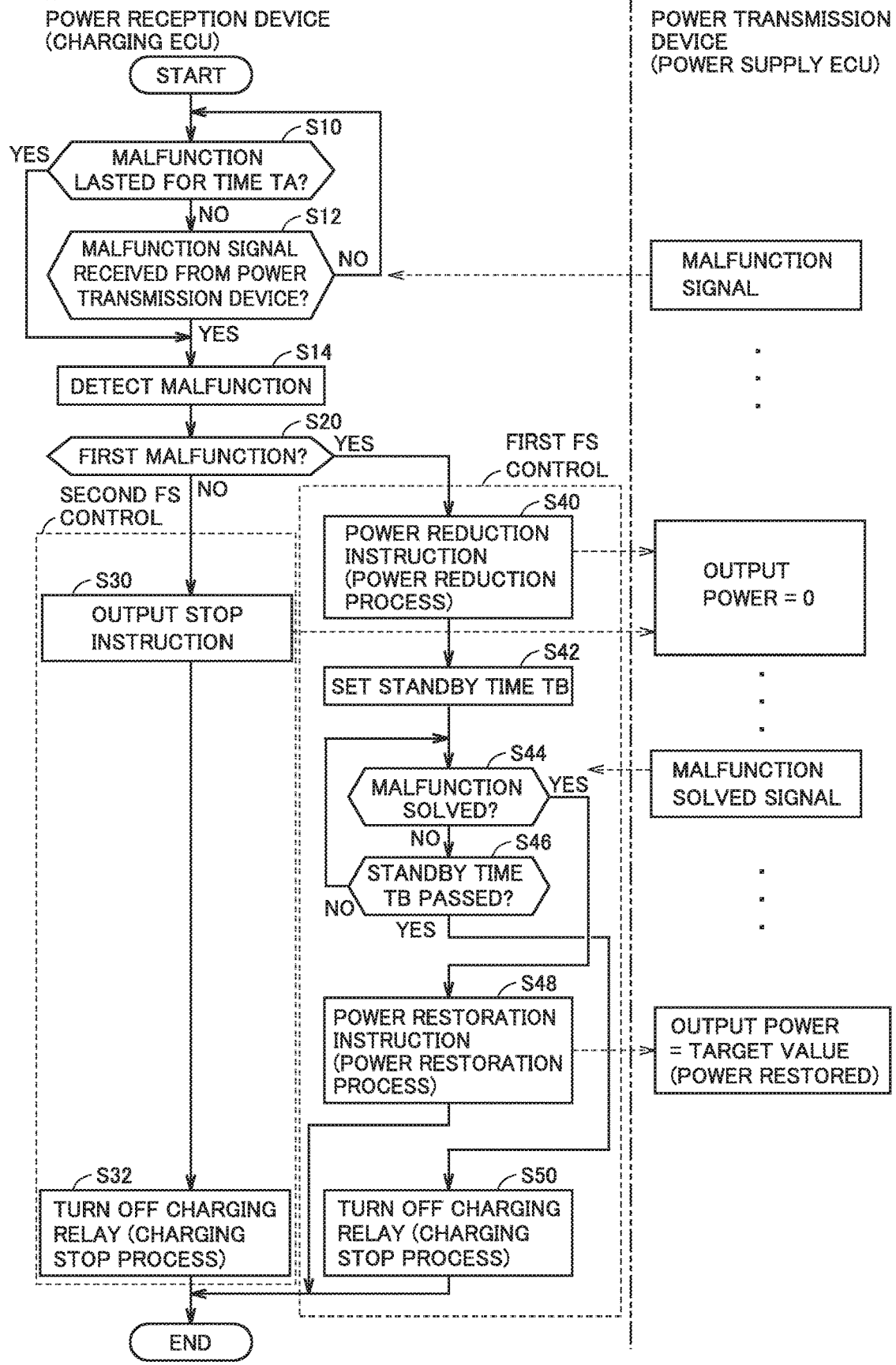

POWER RECEPTION DEVICE, POWER TRANSFER SYSTEM, AND CONTROL METHOD OF POWER RECEPTION DEVICE

CROSS REFERENCE TO RELATED APPLICATIONS

This nonprovisional application claims priority to Japanese Patent Application No. 2018-193404 filed on Oct. 12, 2018 with the Japan Patent Office, the entire contents of which are hereby incorporated by reference.

BACKGROUND

Field

The present disclosure relates to a power reception device configured to receive power from a power transmission device, a power transfer system including the power transmission device and the power reception device, and a control method of the power reception device.

Description of the Background Art

Japanese Patent Laying-Open No. 2016-82877 discloses a power transfer system including a power transmission device and a vehicle equipped with a power reception device. The power reception device includes a power reception unit configured to receive power from the power transmission device, a power storage device, and a charging relay provided between the power reception unit and the power storage device. When a malfunction is detected during external charging in which the charging relay is switched to an ON state (closed state) so that the power storage device is charged with power received from the power transmission device, the power transfer system stops the external charging by switching the charging relay to an OFF state (open state), and resumes the external charging by switching the charging relay back to the ON state if the malfunction is solved.

SUMMARY

As disclosed in Japanese Patent Laying-Open No. 2016-82877, when a malfunction is detected during the external charging, the external charging may not be continued normally, and thus, it is desired to switch the charging relay to the OFF state so as to stop the external charging.

However, depending on the types of malfunctions, the malfunction may be temporary and may be solved in a short time. If the charging relay is simply switched to the OFF state to stop the external charging without taken into consideration the aforementioned possibility, it may increase the number of operation times of the charging relay (the number of switching times between the ON state and the OFF state), which may cause the charging relay to be damaged early.

The present disclosure has been made to solve the aforementioned problems, and an object of the present disclosure is to properly stop external charging when a malfunction is detected during the external charging so as to prevent a charging relay horn being damaged early.

(1) A power reception device according to the present disclosure is configured to receive power from a power transmission unit provided in, a power transmission device, and includes a power reception unit configured to receive power from the power transmission unit, a power storage device, a chanting relay provided between the power reception unit and the power storage device, and a controller configured to execute a first fail-safe control when a malfunction is detected during external charging in which the charging relay is switched to an ON state so that the power storage device is charged with power received from the power transmission unit by the power reception unit. In the fast fail-safe control, the controller is configured to perform a power reduction process so as to reduce an output power of the power transmission unit lower than a target value with the charging relay being maintained at the ON state, perform a power restoration process so as to restore the output power to the target value if the malfunction is solved before a standby time has passed since the start of the power reduction process, and perform a charging stop process so as to stop the external charging by switching the charging relay to an OFF state if the malfunction is not solved after the standby time has passed since the start of the power reduction process.

According to the power reception device mentioned above, the first fail-safe control is executed when a malfunction is detected during the external charging. In the first fail-safe control, firstly, the output power of the power transmission unit is reduced lower than a target value with the charging relay being maintained at the ON state, and if the malfunction is solved before the standby time has passed, the output power of the power transmission unit is restored to the target value. Thus, according to the first fail-safe control, even though a malfunction is detected, if the malfunction is solved before the standby time has passed, the external charging may be resumed without switching the charging relay to the OFF state. Thus, compared with the case where the charging relay is switched to the OFF state immediately every time when a malfunction is detected, it is possible to reduce the number of operation times of the charging relay. On the other hand, if the malfunction is not solved after the standby time has passed, the charging relay is switched to the OFF state so as to stop the external charging. As a result, when a malfunction is detected during the external charging, it is possible to properly stop the external charging so as to prevent the charging relay from being damaged early.

(2) In an embodiment, the malfunction is classified into a first malfunction or a second malfunction, and the controller is configured to execute the first fail-safe control when a malfunction is detected during the external charging and the detected malfunction is classified into the first malfunction, and a second fail-safe control to stop the external charging by switching the charging relay to the OFF state without waiting for the standby time to pass when a malfunction is detected during the external charging and the detected malfunction is classified into the second malfunction.

According to the embodiment mentioned above, when the detected malfunction is classified into the first malfunction, the first fail-safe control is executed to switch the charging relay to the OFF state if the malfunction is not solved after the standby time has passed. Therefore, by classifying a malfunction that is likely to be solved in a short time into the first malfunction, for example, it is possible to prevent the charging relay from being unnecessarily operated if the malfunction may be solved in a short time. On the other hand, when the detected malfunction is classified into the second malfunction, the second fail control is executed to switch the charging relay to the OFF state without waiting for the standby time to pass. Therefore, by classifying a malfunction that is not likely to be solved in a short time into the second malfunction, for example, it is possible to prevent the charging relay from being maintained at the ON state in vain if the malfunction may not be solved in a short time.

(3) In an embodiment, the type of the first malfunction includes a plurality of types of malfunctions, and the controller is configured to set the standby time or the first fail-safe control according to the type of the first malfunction.

According to the embodiment mentioned above, the standby time may be appropriately set to different lengths according to the type of the first malfunction.

(4) In an embodiment, the power reception device is configured to communicate with the power transmission device. The type of the first malfunction includes interruption of communication that the communication with the power transmission device is interrupted, and intrusion of foreign object that it is detected that a foreign object has intruded into an area around the power transmission unit. The controller is configured to set the standby time to a first time if the first malfunction is the intrusion of foreign object, and set the standby time to a second time which is shorter than the first time if the first malfunction is the interruption of communication.

According to the embodiment mentioned above, the standby time may be appropriately set based on the fact that the interruption of wireless communication may be solved in a shorter time than the intrusion of foreign object.

(5) In an embodiment, the type of the second malfunction includes at least one of unit failure indicating detection of a failure in at least one of the power transmission unit and the power reception unit, unit overheat indicating detection of overheat at least one of the power transmission unit and the power reception unit, detection of foreign object indicating detection of a foreign object on a surface of the power transmission unit, and position misalignment indicating detection of misalignment of the power transmission unit and the power reception unit.

According to the embodiment mentioned above, since the unit failure, the unit overheat, the detection of foreign object and the position misalignment are unlikely to be solved in a short time, they are classified into the second malfunction. Thus, it is possible to prevent the charging relay from being maintained at the ON state in vain if the detected malfunction is not likely to be solved in a short time.

(6) A power transfer system according to the present disclosure includes a power transmission unit provided in a power transmission device, a power reception unit configured to receive power from the power transmission unit, a power storage device, a charging relay provided between the power reception unit and the power storage device, and a controller configured to execute a first fail-safe control when a malfunction is detected during extort al charging in which the charging relay is switched to an ON state so that the power storage device is supplied with power from the power reception unit. In the first fail-safe control, the controller being configured perform a power reduction process so as to reduce the output power of the power transmission unit lower than a target value with the charging relay being maintained at the ON state, per a power restoration process so as to restore the output power to the target value if the malfunction is solved before a standby time has passed since the start of the power reduction process, and perform a charging stop process so as to stop the external charging by switching the charging relay to an OFF state if the malfunction is not solved after the standby time has passed since the start of the power reduction process.

(7) The control method of a power reception device according to the present disclosure is a control method of a power reception device configured to receive power from a power transmission unit provided in a power transmission device. The power reception device includes a power reception unit configured to receive power from the power transmission unit, a power storage device, and a charging relay provided between the power reception unit and the power storage device. The control method includes performing a power reduction process when a malfunction is detected during external charging in which the charging relay is switched to an ON state so that the power storage device is charged with power received from the power transmission unit by the power reception unit so as to reduce the output power of the power transmission unit lower than a target value with the charging relay being maintained at the ON state, performing a power restoration process so as to restore the output power to the target value if the malfunction is solved before a standby time has passed since the start of the power reduction process, and performing a charging stop process so as to stop the external charging by switching the charging relay to an OFF state if the malfunction is not solved after the standby time has passed since the start of the power reduction process.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart schematically illustrating a fail-safe control to be performed when a malfunction is detected by a charging ECU of the power reception device in communication with a power supply ECU of the power transmission device.

DETAILED DESCRIPTION

Figure 1:
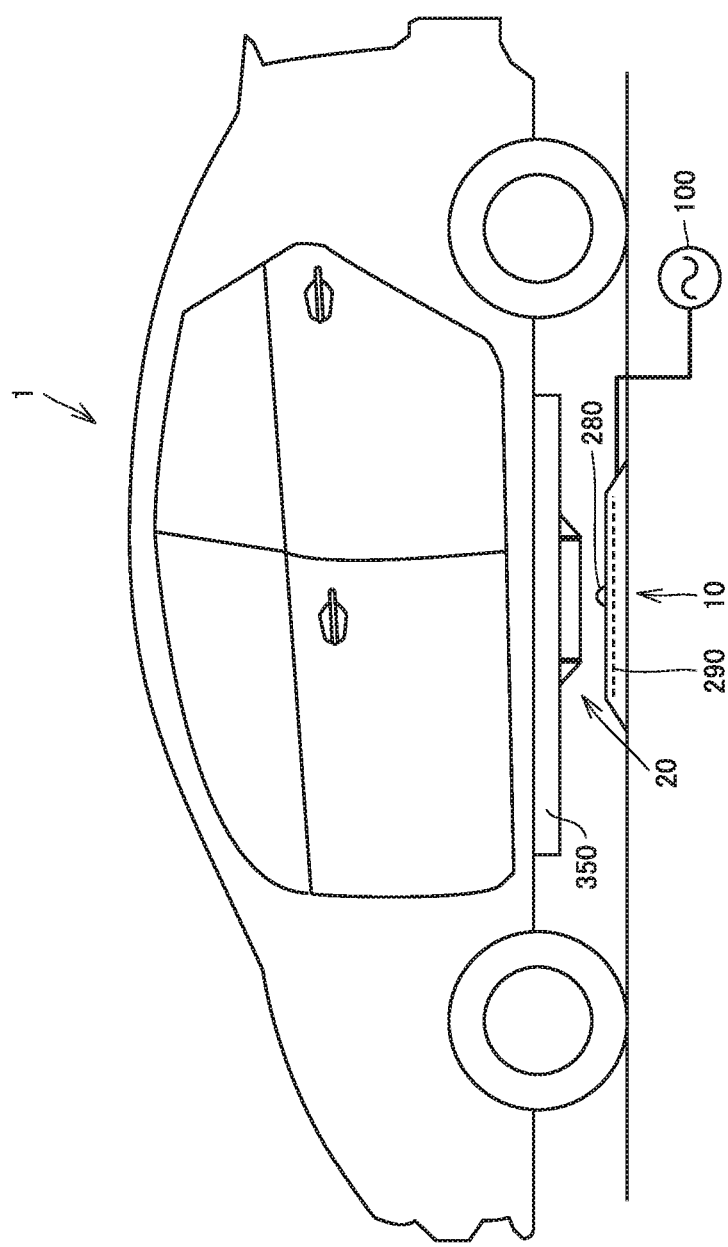
FIG. 1 is an external view of a power transfer system.

Hereinafter, embodiments of the present disclosure will be described in detail with reference to the drawings. In the drawings, the same or corresponding portions are denoted by the same reference numerals and description thereof will not be repeated. In the following description, an electronic control unit may be referred to as "ECU" where appropriate.

<Configuration of Power Transfer System>

FIG. 1 is an external view of a power transfer system according to the present embodiment. The power transfer system includes a vehicle 1 and a power transmission device 10. The vehicle 1 is equipped with a power reception device 20. The power reception device 20 is disposed on the bottom surface of the vehicle 1, for example, on a lower surface (facing the road) of a power storage device 350 installed on the bottom surface of the vehicle 1. The vehicle 1 is configured to travel by using the power supplied from the power transmission device 10 and stored in the power storage device 350.

The power transmission device 10 receives power from an AC power supply 100 (for example, a commercial power supply). The power transmission device 10 is installed on the ground. The power transmission device 10 is configured to transmit power in a wireless manner to the power reception device 20 through a magnetic field when the vehicle 1 is aligned such that the power reception device 20 of the vehicle 1 faces the power transmission device 10.

The power transmission device 10 includes a camera 280. The camera 280 is equipped with a fisheye lens and is disposed substantially at the center of the upper surface of the power transmission device 10. Since the camera 280 is equipped with a fisheye lens, it is possible for it to capture a wide space including the power reception device 20 when the vehicle 1 is being moved toward the power transmission device 10.

An image captured by the camera 280 is used as information indicating the relative position of the power reception device 20 of the vehicle 1 to the power transmission device 10 when the vehicle 1 is being aligned relative to the power transmission device 10. In addition, the image captured by the camera 280 is also used as information for detecting whether or not a foreign object has intruded into a predetermined area around the power transmission device 10. The foreign object that may be detected by the camera 280 include, for example, animals.

The power transmission device 10 further includes a foreign object detection device 290. The foreign object detection device 290 is configured to magnetically detect a metal foreign object (such as a beverage can or a coin) when such foreign object is present on the upper surface attic power transmission device 10.

Figure 2:
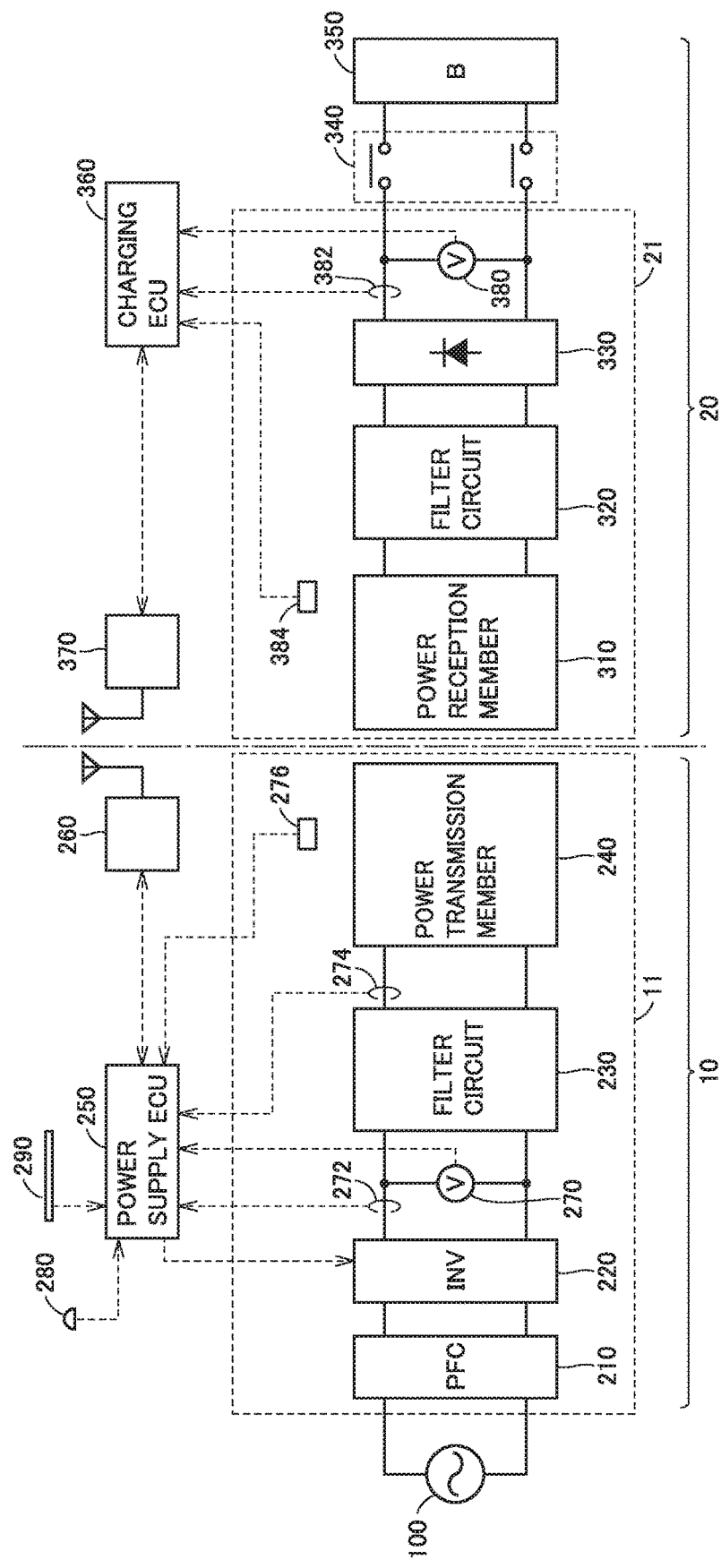
FIG. 2 is a diagram illustrating an overall configuration of a power transmission device and a power reception device.

FIG. 2 is a diagram illustrating an overall configuration of the power transmission device 10 and the power reception device 20.

The power transmission device 10 includes a power transmission unit 11, a power supply ECU 250, a communication unit 260, and the camera 280 and the foreign object detection device 290 which are mentioned above. The power transmission unit 11 includes a PFC (Power Factor Correction) circuit 210, an inverter 220, a filter circuit 230, a power transmission member 240, a voltage sensor 270, a current sensor 272, a current sensor 274, and a temperature sensor 276.

The power reception device 20 includes a power reception unit 21, a charging relay 340, a power storage device 350, a charging ECU 360, and a communication unit 370. The power reception unit 21 includes a power reception member 310, a filter circuit 320, a rectification unit 330, a voltage sensor 380, a current sensor 382, and a temperature sensor 384.

According to the power transfer system, in the power transmission device 10, the power received from the AC power supply 100 such as a commercial power supply is rectified and boosted in the ETC circuit 210 and then supplied to the inverter 220. The inverter 220 converts the power rectified by the PFC circuit 210 into AC power and supplies it to the power transmission member 240 through the filter circuit 230. Each of the power transmission member 240 and the power reception member 310 includes a resonance circuit configured to resonate at the frequency of the transmission power.

When the AC power is supplied from the inverter 220 through the filter circuit 230 to the power transmission member 240, a magnetic field is formed between a power transmission coil (not shown) provided in the power transmission member 240 and a power reception coil (not shown) provided in the paver reception member 310, and thereby, the energy (or power) is transferred from the power transmission member 240 to the power reception member 310 through the magnetic field. The energy (or power) transferred to the power reception member 310 is supplied to the power storage device 350 through the filter circuit 320 and the rectification unit 330. Thus, the power storage device 350 is charged.

The power storage device 350 is a rechargeable DC power supply, and includes a secondary battery such as a lithium-ion battery or a nickel-metal hydride battery. The charging relay 340 is provided between the rectification unit 330 and the power storage device 350. The charging relay 340 is switched to the ON state (the conductive state) during external charging in which the power storage device 350 is charged by the power reception unit 21 with power received from the power transmission unit 11. However, if the external charging is not performed, the charging relay 340 is switched to the OFF state (the non-conductive state).

The voltage sensor 270 is configured to detect an output voltage of the inverter 220. The current sensor 272 is configured to detect a current flowing through the inverter 220, i.e., an output current of the inverter 220. The current sensor 274 is configured to detect a current flowing through the power transmission member 240. The temperature sensor 276 is configured to detect a temperature of the power transmission unit 11. The detection results of these sensors are sent to the power supply ECU 250.

The camera 280 is configured to capture an image of the periphery of the power transmission device 10. The foreign object detection device 290 is configured to magnetically detect a foreign object present on the upper surface of the power transmission device 10. The results obtained by the camera 280 and the foreign object detection device 290 are sent to the power supply ECU 250.

The power supply ECU 250 includes a CPU (Central Processing Unit), a memory an it port for inputting/outputting various signals and the like (none of which is shown), and is configured to receive signals from each sensor and execute a control on various units provided in the power transmission device 10. For example, when the power is to be transmitted from the power transmission device 10 to the power reception device 20, the power supply ECU 250 performs a switching control on the PFC circuit 210 and the inverter 220. Note that the control is not necessarily processed, by software, it may be processed by dedicated hardware (such as an electronic circuit).

The communication unit 260 is configured to wirelessly communicate with the communication unit 370 of the power reception device 20. For example, the communication unit 260 sends a malfunction signal to the power reception device 20 when a malfunction is detected in the power transmission device 10, or receives a malfunction signal from the power reception device 20.

The voltage sensor 380 provided in the power reception device 20 is configured to detect a voltage output from the rectification unit 330. The current sensor 382 is configured to detect a current output from the rectification unit 330. The voltage sensor 380 and the current sensor 382 may be provided between the power reception member 310 and the rectification unit 330 (for example, between the filter circuit 320 and the rectification unit 330). The temperature sensor 384 is configured to detect the temperature of the power reception unit 21. The detection results of these sensors are sent to the charging ECU 360.

The charging ECU 360 includes a CPU, a memory, an input/output port and the like (none of which is shown), and is configured to receive signals from each sensor and perform a control on various units provided in the power reception device 20. Note that the control is not necessarily processed by software, it may be processed by dedicated hardware (such as an electronic circuit).

The communication unit 370 is configured to receive a malfunction signal from the power transmission device 10 or send a malfunction signal to the power transmission device 10 when a malfunction is detected in the power reception device 20, for example.

<Malfunction Detection>

The power transfer system according to the present embodiment is configured to detect malfunctions in the system. The types of malfunctions to be detected by the power transfer system are summarized in the following.

1. Unit Failure

The power transfer system is configured to detect that a failure in the power transmission unit 11 of the power transmission device 10 and a failure in the power reception unit 21 of the power reception device 20.

The failure in the power transmission unit 11 is detected by the power supply ECU 250. The power supply ECU 250 detects that the power transmission unit 11 is in failure when the detection result of at least one of the voltage sensor 270 and the current sensors 272 and 274 has been greater than a normal range (the abnormal state has lasted) for a predetermined time TA.

The failure in the power reception unit 21 is detected by the charging ECU 360. The charging ECU 360 detects that the power reception unit 21 is in failure when the detection result of at least one of the voltage sensor 380 and the current sensor 382 has been greater than a normal range (the abnormal state has lasted) for a predetermined time TA.

2. Unit Overheat

The power transfer system is configured to detect the overheat of the over transmission unit 11 and the overheat of the power reception unit 21.

The overheat of the power transmission unit 11 is detected by the power supply ECU 259. The power supply ECU 250 detects that the power transmission unit 11 is overheated when the detection result of the temperature sensor 276 has been greater than a threshold (the abnormal state has lasted) for a predetermined time TA.

The overheat of the power reception unit 21 is detected by the charging ECU 360. The charging ECU 360 detects that the power reception unit 21 is overheated when the detection result of the temperature sensor 384 has been greater than a threshold (the abnormal state has lasted) for a predetermined time TA.

3. Detection of Foreign Object

The power transfer system is configured to detect the presence of a metal foreign object on the top surface of the power transmission device 10. The detection of a foreign object is performed by the power supply ECU 250. The power supply ECU 250 detects that a foreign object is present when the detection result of the foreign object detection device 290 indicates that a metal foreign object has been present on the upper surface of the power transmission device 10 (the abnormal state has lasted) for a predetermined time TA.

4. Intrusion of Foreign Object

The power transfer system is configured to detect that a foreign object such as an animal has intruded into an area, around the power transmission device 10. The detection of intrusion is performed by the power supply ECU 250. The power supply ECU 250 detects a foreign object has intruded into an area around the power transmission device 10 when an image captured by the camera 280 indicates that a foreign object has intruded into an area around the power transmission device 10 (the abnormal state has lasted) for a predetermined time TA.

5. Position Misalignment

The power transfer system is Configured to detect that the position of the power reception device 20 of the vehicle 1 relative to the power transmission device 10 is deviated (misaligned) from the target position. The detection of position misalignment is performed by the charging ECU 360. The charging ECU 360 receives an image captured by the camera 280 from the power transmission device 10, and determines the presence or absence of position misalignment based on the image captured by the camera 280. The charging ECU 360 detects the position is misaligned when the position misalignment has lasted (the abnormal state has lasted) for a predetermined time TA.

6. Interruption of Wireless Communication

The power transfer system is configured to detect whether or not the wireless communication between the communication unit 260 of the power transmission device 10 and the communication unit 370 of the power reception device 20 is interrupted.

The interruption of wireless communication is detected by the power supply ECU 250 and the charging ECU 360, respectively. The power supply ECU 250 detects that the wireless communication with the power reception device 20 is interrupted when the wireless communication with the power reception device 20 has been, interrupted (the abnormal state has lasted) for a predetermined time TA. Similarly, the charging ECU 360 detects that the wireless communication with the power transmission device 10 is interrupted when the wireless communication with the power transmission device 10 has been interrupted (the abnormal state has lasted) for a predetermined time TA.

As described in the above, the types of malfunctions to be detected by the power supply ECU 250 of the power transmission device 10 include the unit failure (failure of the power transmission unit 11), the unit overheat (overheat of the power transmission unit 11), the detection of foreign object, the intrusion of foreign object, and the interruption of wireless communication. When a malfunction other than the interruption of wireless communication among the malfunctions described above is detected, the power supply ECU 250 wirelessly sends a malfunction signal including information indicating the type of the malfunction to the power reception device 20 for information sharing.

The types of malfunctions to be detected by the charging ECU 360 of the power reception device 20 include the unit failure (failure of the power reception unit 21), the unit overheat (overheat of the power reception unit 21), the position misalignment, and the interruption of wireless communication. When a malfunction other than the interruption of wireless communication among the malfunctions described above is detected, the charging ECU 360 sends a malfunction signal including information indicating the type of the malfunction to the power transmission device 10 for information sharing.

The predetermined time TA may be set to different values according to different types of malfunctions. For example, the predetermined time TA may be set to 0 when the intrusion of foreign object, is detected on the basis of an image captured by the camera 280.

<Fail-Safe Control to be Performed When a Malfunction is Detected>

In the power transfer system having the Configuration as described above, when a malfunction is detected during the external charging, the external charging may not be normally continued, and thus, it is desired to switch the charging relay 340 to the OFF state so as to stop the external charging.

However, depending on the types of malfunctions, the malfunction may be temporary and may be solved in a short time. If the charging relay 340 is switched to the OFF state to stop the external charging without taken into consideration the aforementioned possibility, it may increase the number of operation times of the charging relay 340 (the number of switching times between the ON state and the OFF state), which may cause the charging relay 340 to be damaged early.

Therefore, the power transfer system according to the present embodiment classifies the detected malfunction into a sort of malfunction that is likely to be solved in a short time (hereinafter also referred to as "first malfunction") or a sort of malfunction that is not likely to be solved in a short time (hereinafter referred to as "second malfunction"). The power transfer system performs a Fail-Safe (FS) control in different manner depending on whether the detected malfunction is a first malfunction or a second malfunction.

Figures 3, 4:
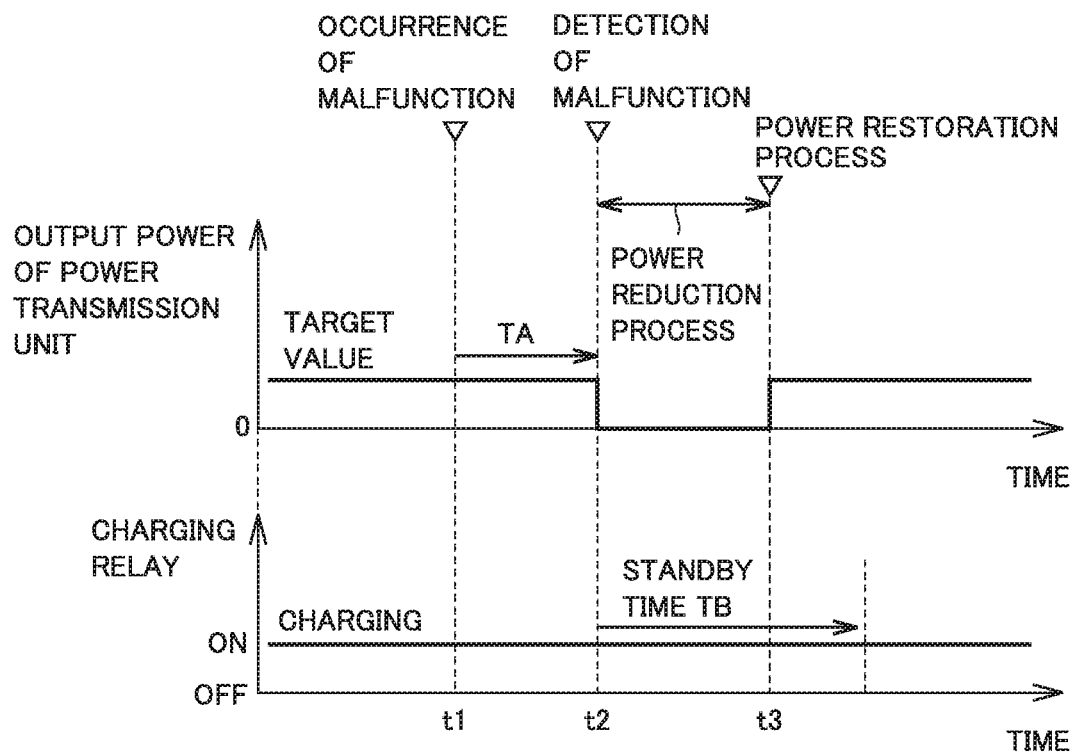
FIG. 3 is a view illustrating a relation between the classification of malfunctions, the types of malfunctions, and a fail-safe control to be performed when a malfunction is detected.
FIG. 4 is a diagram schematically illustrating the output power changes of a power transmission with and the state changes of a charging relay when the detected malfunction is interrupt on of wireless communication (first malfunction) that is likely to be solved in a short time.

FIG. 3 is a view illustrating a relation between the classification of malfunctions, the types of malfunctions, and a fail-safe control to be performed when a malfunction is detected.

Generally, the interruption of wireless communication may occur relatively frequently and temporally depending on the surrounding environment, and it may be solved in a short time. The intrusion of foreign object may be temporarily detected when an animal or the like moves in an area around the power transmission device 10, and it may be solved in a short time. Therefore, in the present embodiment, as illustrated in FIG. 3, the interruption of wireless communication and the intrusion of foreign object are classified into the first malfunction that is likely to be solved in a short time.

If the detected malfunction is classified into the first malfunction, the power transfer system performs a first fail-safe (FS) control. In the first fail-safe control, firstly, a power reduction process is performed so as to reduce the power output from the power transmission unit 11 to the power reception unit 21 (hereinafter, simply referred to as the output power of the power transmission unit 11 where appropriate) to a value (for example, 0) which is lower than a target value with the charging relay 340 being maintained at the ON state. If the malfunction is solved before the standby time TB has passed since the start of the power reduction process, a power restoration process is performed so as to restore the output power of the power transmission unit 11 to the target value. On the other hand, if the malfunction is not solved after the standby time TB has passed since the start of the power reduction process, a charging stop process is performed by switching the charging relay 340 to the OFF state so as to stop the external charging. In addition to the switching of the charging relay 340 to the OFF state, the charging stop process includes shutting off a low voltage power supply to be used by an auxiliary device such as the power supply ECU 250 and cutting off the wireless communication between the power transmission device 10 and the power reception device 20.

The standby time TB for the first FS control may be set in accordance with the time required to solve the detected malfunction. Further, the standby time TB may be set in accordance with the type of the first malfunction. For example, it is often that the interruption of wireless communication may be solved in a shorter time than the intrusion of foreign object. Therefore, the power transfer system sets the standby time TB to a first time T1 (for example, about several tens of seconds) if the type of the detected first malfunction is the intrusion of foreign object. On the other hand, if the type of the detected first malfunction is the interruption of wireless communication, the standby time TB is set to a second time T2 (for example, about several seconds) which is shorter than the first time T1. Thus, the standby time TB may be appropriately set in accordance with the type of the first malfunction.

FIG. 4 is a diagram schematically illustrating the output power changes of the power transmission unit 11 and the state changes of the charging relay 340 when the detected malfunction is the interruption of wireless communication (the first malfunction) that is likely to be solved in a short time.

If it is detected at time t2 that the interruption of wireless communication occurred at time t1 has lasted for a predetermined time TA and the detected interruption of wireless communication is classified into the first malfunction, the first FS control is started. In the first FS control, firstly, a power reduction process is performed so as to reduce the output power of the power transmission unit 11 from the target value to "0" immediately, preventing the external charging from being continued when the wireless communication is interrupted. During the power reduction process, the charging relay 140 is maintained at the ON state without being switched to the OFF state.

It should be noted that it is not necessary to reduce the output power of the power transmission unit 11 to "0" during the power reduction process, it may be reduced to such a level (for example, several hundred watts) that no major problem will occur even if a malfunction is present.

If it is detected at time t3 that the interruption of wireless communication is solved before the standby time TB (=the second time T2) has passed since the start of the power reduction process, a power restoration process is preformed so as to restore the output power of the power transmission unit 11 to the target value. According to the first FS control, even though the interruption of wireless communication is detected, if the interruption of wireless communication is solved before the standby time TB has passed, the external charging may be resumed without switching the charging relay 340 to the OFF state. Thus, compared with the case where the charging relay 340 is switched to the OFF state immediately every time when a malfunction is detected, it is possible to reduce the number of operation times of the charging relay 340 so as to prevent the charging relay 340 from being damaged early, winch makes it possible to improve the lifetime of the charging relay 340. Moreover, since it is not necessary to stop and restart the external charging, it is possible to shorten the time required for the external charging.

Figure 5:
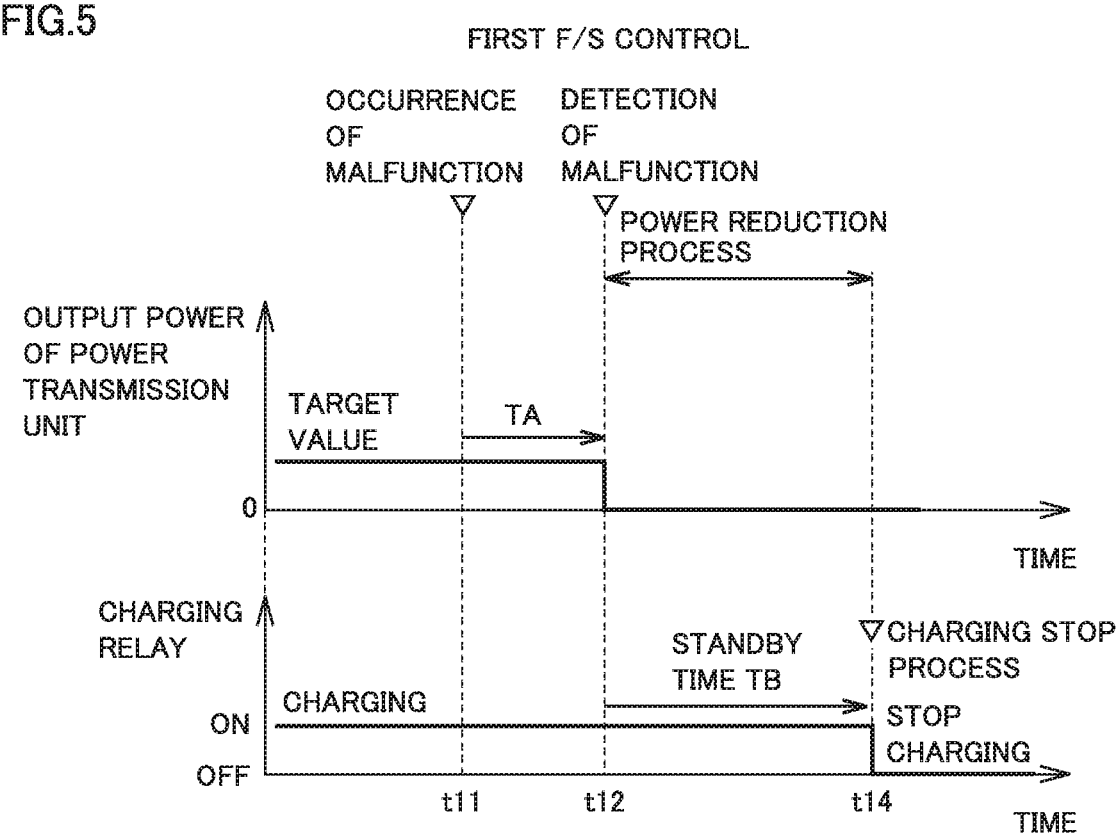
FIG. 5 is a diagram schematically illustrating the output power changes of a power transmission unit and the state changes of a charging relay when the detected malfunction is interruption of wireless communication (first malfunction) that is not likely to be solved in a short time.

FIG. 5 is a diagram schematically illustrating the output power changes of the power transmission unit 11 and the state changes of the charging relay 340 when the detected malfunction is the interruption of wireless communication (the first malfunction) that is not likely to be solved in a short time.

If it is detected at time t12 that the interruption of wireless communication occurred at time t11 has lasted for a predetermined time TA and the detected interruption of wireless communication is classified into the first malfunction, the first FS control is started. Specifically, firstly, the power reduction process is performed so as to reduce the output power of the power transmission unit 11 from the target value to "0" immediately.

If the interruption of wireless communication is not solved even at time t14 at which the standby time TB (=the second time T2) has passed since the start of the power reduction process, it is considered that the interruption of wireless communication is not temporary and may not be solved in a short time, a charging stop process is performed so as to switch, the charging relay 340 to the OFF state, preventing the power reduction process from being continued unnecessarily.

Returning to FIG. 3, besides the first malfunction (the interruption of wireless communication and the intrusion of foreign object), the unit failure, the unit overheat, the detection of foreign object, and the position misalignment are classified into the second malfunction which is not likely to be solved in a short time.

If the detected malfunction is classified into the second malfunction, the power transfer system performs a second FS control. In the second FS control, the charging relay 340 is switched to the OFF state immediately as a malfunction is detected without waiting for the standby time TB to pass.

Figure 6:
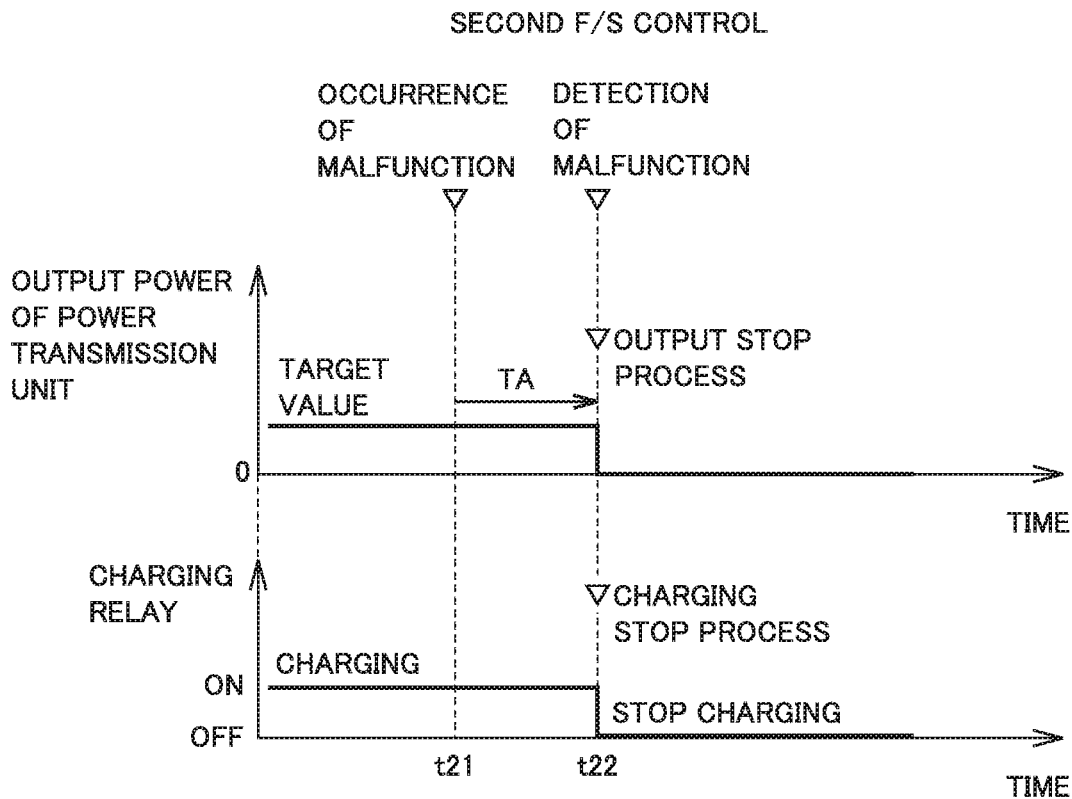
FIG. 6 is a diagram schematically illustrating the output power changes of a power transmission unit and the state changes of a charging relay when the detected malfunction is unit failure (second malfunction)

FIG. 6 is a diagram schematically illustrating the output power changes of the power to unit 11 and the state changes of the charging relay 340 when the detected malfunction is the unit failure which is classified into the second malfunction.

If it is detected at time t22 that the unit failure occurred at time t21 has lasted for a predetermined time TA and the detected unit failure is classified into the second malfunction, the second FS control is started. In the second FS control, an output stop process is performed so as to reduce the output power of the power transmission unit 11 to "0" immediately while switching the charging relay 340 to the OFF state immediately without wailing for the standby time TB to pass. As a result, it is possible to prevent the charging relay 340 from being maintained at the ON state unnecessarily when the malfunction is not likely to be solved in a short time.

FIG. 7 is a flowchart schematically illustrating a fail-safe control to be performed when a malfunction is detected by the charging ECU 360 of the power reception device 20 in communication with the power supply ECU 250 of the power transmission device 10. The flowchart is executed after the charging relay 340 is switched to the ON state so as to perform the external charging.

The charging ECU 360 determines whether any of the unit failure (malfunction in the power reception unit 21), the unit overheat (overheat of the power reception unit 21), the position misalignment, and the interruption of wireless communication has lasted for a predetermined time TA (step S10).

When the malfunction does not last for a predetermined time TA (NO at step S10), the charging ECU 360 determines whether or not a malfunction signal is received from the power transmission device 10 (step S12). The malfunction signal is output from the power transmission device 10 to the power reception device 20 when any of the unit failure (malfunction in the power transmission unit 11), the unit overheat (overheat of the power transmission unit 11), the detection of foreign object, and the intrusion of foreign object has lasted for a predetermined time TA in the power transmission device 10. The malfunction signal includes information indicating the type of malfunction (the unit failure, the unit overheat, the detection of foreign object or the intrusion of foreign object).

When the malfunction has lasted for a predetermined time TA (YES at step S10) or when a malfunction signal is received from the power transmission device 10 (YES at step S12), the malfunction is detected by the charging ECU 360 (step S14).

The charging ECU 360 determines whether or not the malfunction detected at step S14 is classified into the first malfunction, that is, whether or not it is the interruption of wireless communication or the intrusion of foreign object (step S20).

If the detected malfunction is classified into the first malfunction (YES at step S20), the charging ECU 360 executes the first FS control mentioned above (steps S40 to S50).

Specifically, firstly, the charging ECU 360 sends, to the power transmission device 10, a power reduction instruction to set the output power of the power transmission unit 11 to a value such as "0" that is lower than the target value (step S40). This process corresponds to the power reduction process mentioned above. During the power reduction process, the charging relay 340 is maintained at the ON state.

The power transmission device 10 (the power supply ECU 250) sets the output power of the power transmission unit 11 to "0" in accordance with the power reduction instruction received from the power reception device 20. It should be noted that when the interruption of wireless communication occurs, it is impossible for the power transmission device 10 to receive the power reduction instruction from the power reception device 20, the power transmission device 10 may be configured to reduce the output power of the power transmission unit 11 to "0" autonomously.

Thereafter, the charging ECU 360 sets the standby time TB in accordance with the type of the first malfunction (the interruption or wireless communication or the intrusion of foreign object) (step S42). Specifically, as illustrated in FIG. 3, the charging ECU 360 sets the standby time TB to a first time T1 if the type of the detected first malfunction is the intrusion of foreign object, and sets the standby time TB to a second time T2 which is shorter than, the first time T1 if the type of the detected first malfunction is the wireless communication disruption.

Then, the charging ECU 360 determines whether or not the malfunction has been solved (step S44). The charging ECU 360 determines that the malfunction has been solved when the detected malfunction is solved in the power transmission device 10, or receiving from the power transmission device 10 a malfunction solved signal indicating that the detected malfunction is solved in the power transmission device 10.

If the malfunction has not been solved (NO at step S44), the charging ECU 360 determines whether or not the standby time TB set at step S42 has passed since the start of the power reduction process (step S46). If the standby time TB has not passed (NO at step 846), the charging ECU 360 returns the process to step S44.

If the malfunction is solved before the standby time TB has passed since the start of the power reduction process (YES at step S44), the charging ECU 360 sends, to the power transmission device 10, a power restoration instruction to restore the output power of the power transmission unit 11 to the target value (step S48). This process corresponds to the power restoration process mentioned above. The power transmission device 10 restores the output power of the power transmission unit 11 to the target value in accordance with the power restoration instruction received from the power reception device 20.

If the malfunction is not solved after the standby time TB has passed since the start of the power reduction process (YES at step S46), the charging ECU 360 switches the charging relay 340 to the OFF state so as to stop the external charging (step S50). This process corresponds to the charging stop process.

On the other hand, if the detected malfunction is classified into the second malfunction (NO at step S20), the charging ECU 360 executes the second FS control mentioned above (steps S30 and S32). Specifically, the charging ECU 360 sends, to the power transmission device 10, an output stop instruction to set the output power of the power transmission unit 11 to "0" (step S30), and switches the charging relay 340 to the OFF state so as to stop the external charging immediately without waiting for the standby time TB to pass (step S32).

Although FIG. 7 illustrates that the power reception device 20 (the charging ECU 360) communicates with the power transmission device 10 (the power supply ECU 250) so as to perform a fail-safe control when a malfunction is detected, the power transmission device 10 (the power supply ECU 250) may communicates with the power reception device 20 (the charging ECU 360) so as to perform the fail-safe control when a malfunction is detected. In this case, the power reduction process and the power restoration process may be directly performed by the power transmission device 10 (the power supply ECU 250). In addition, the charging stop process may be performed in accordance with a charging stop instruction sent from the power transmission device 10 to the power reception device 20.

As described above, according to the power transfer system of the present embodiment, the first fail-safe control is executed when a first malfunction (the interruption of wireless communication or the intrusion of foreign object) that is likely to be solved in a short time is detected during the external charging. In the first fail-safe control, firstly, the output power of the power transmission unit 11 is reduced lower than a target value with the charging relay 340 being maintained at the ON state, and if the malfunction is solved before the standby time TB has passed, the output power of the power transmission unit 11 is restored to the target value. Thus, according to the first fail-safe control, even though a malfunction is detected, if the malfunction is solved before the standby time TB has passed, the external charging may be resumed without switching the charging relay 340 to the OFF state. Thus, compared with the case where the charging relay 340 is switched to the OFF state immediately every time when a malfunction is detected, it is possible to reduce the number of operation times of the charging relay 340. On the other hand, if the malfunction is not solved after the standby time TB has passed, the charging relay 340 is switched to the OFF state so as to stop the external charging. As a result, when a malfunction is detected during the external charging, it is possible to properly stop the external charging so as to prevent the charging relay from being damaged early.

On the other hand, when a second malfunction (the unit failure, the unit overheat, the foreign object detection, or the position misalignment) that is not likely to be solved in a short time is detected during the external charging, the second fail-safe control is executed by switching the charging relay to the OFF state without waiting for the standby time to pass. Therefore, it is possible to prevent the charging relay from being maintained at the ON state in vain if the malfunction may not be solved in a short time.

<Modification>

If the malfunction is not the unit failure or the position misalignment (i.e., the malfunction is the unit overheat, the detection of foreign object, the intrusion of foreign object or the interruption of wireless communication) among the plurality of malfunctions described above in the embodiment, it may be solved in several minutes or several tens of minutes after the external charging is stopped according to the first FS control or the second FS control. Therefore, if the external charging is stopped due to the occurrence of a malfunction (the unit overheat, the detection of foreign object, the intrusion of foreign object or the interruption of wireless communication) other than the unit failure or the position misalignment, it is acceptable to try to resume the external charging after waiting for some time.

In the embodiment mentioned above, although it is described that the fail-safe control according to the present disclosure is applied to the power transfer system in which the power is transmitted wireless from the power transmission device 10 to the power reception device 20, the fail-safe control according to the present disclosure may be applied to a power transfer system in which the power is transmitted from a power transmission device to a power reception device via a power line.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power reception device configured to receive power from a power transmission unit provided in a power transmission device, the power reception device comprising:
   a power reception unit configured to receive power from the power transmission unit;
   a power storage device;
   a charging relay provided between the power reception unit and the power storage device; and
   a controller configured to execute a first fail-safe control when a malfunction is detected during external charging in which the charging relay is switched to an ON state so that the power storage device is charged with power received from the power transmission unit by the power reception unit,
   in the first fail-safe control, the controller being configured to
      perform a power reduction process so as to reduce an output power of the power transmission unit lower than a target value with the charging relay being maintained at the ON state,
      perform a power restoration process so as to restore the output power to the target value if the malfunction is solved before a standby time has passed since a start of the power reduction process, and
      perform a charging stop process so as to stop the external charging by switching the charging relay to an OFF state if the malfunction is not solved after the standby time has passed since the start of the power reduction process.

2. The power reception device according to claim 1, wherein
the malfunction is classified into a first malfunction or a second malfunction,
the controller is configured to execute
the first fail-safe control when a malfunction is detected during the external charging and the detected malfunction is classified into the first malfunction, and
a second fail-safe control to stop the external charging by switching the charging relay to the OFF state without waiting for the standby time to pass when a malfunction is detected during the external charging and the detected malfunction is classified into the second malfunction.

3. The power reception device according to claim 2, wherein
the first malfunction includes a plurality of types of malfunctions,
the controller is configured to set the standby time for the first fail-safe control according to the type of the first malfunction.

4. The power reception device according to claim 3, wherein
the power reception device is configured to communicate with the power transmission device,
the type of the first malfunction includes:
interruption of communication that the communication with the power transmission device is interrupted, and
intrusion of foreign object that it is detected that a foreign object has intruded into an area around the power transmission unit,
the controller is configured to
set the standby time to a first time if the first malfunction is the intrusion of foreign object, and
set the standby time to a second time which is shorter than the first time if the first malfunction is the interruption of communication.

5. The power reception device according to claim 2, wherein
the type of the second malfunction includes at least one of
unit failure indicating detection of a failure in at least one of the power transmission unit and the power reception unit,
unit overheat indicating detection of overheat in at least one of the power transmission unit and the power reception unit,
detection of foreign object indicating detection of a foreign object on a surface of the power transmission unit, and
position misalignment indicating detection of misalignment of the power transmission unit and the power reception unit.

6. A power transfer system comprising:
a power transmission unit provided in a power transmission device;
a power reception unit configured to receive power from the power transmission unit;
a power storage device;
a charging relay provided between the power reception unit and the power storage device;
a controller configured to execute a first fail-safe control when a malfunction is detected during, external charging in which the charging relay is switched to an ON state so that the power storage device is supplied with power from the power reception unit;
in the first fail-safe control, the controller being configured
perform a power reduction process so as to reduce the output power of the power transmission unit lower than a target value with the charging relay being maintained at the ON state,
perform a power restoration process so as to restore the output power to the target value if the malfunction is solved before a standby time has passed since a start of the power reduction process, and
perform a charging stop process so as to stop the external charging by switching the charging relay to an OFF state if the malfunction is not solved after the standby time has passed since the start of the power reduction process.

7. A control method of a power reception device which is configured to receive power from a power transmission unit provided in a power transmission device,
the power reception device including:
a power reception unit configured, to receive power from the power transmission unit;
a power storage device; and
a charging relay provided between the power reception unit and the power storage device,
the control method including:
performing a power reduction process when a malfunction is detected during external charging in which the charging relay is switched to an ON state so that the power storage device is charged with power received from the power transmission unit by the power reception unit so as to reduce the output power of the power transmission unit lower than a target value with the charging relay being maintained at the ON state;
performing a power restoration process so as to restore the output power to the target value if the malfunction is solved before a standby time has passed since a start of the power reduction process; and
performing a charging stop process so as to stop the external charging by switching the charging relay to an OFF state it the malfunction is not solved after the standby time has passed since the start of the power reduction process.

* * * * *

UNITED STATES PATENT AND TRADEMARK OFFICE
CERTIFICATE OF CORRECTION

PATENT NO. : 10,886,791 B2  
APPLICATION NO. : 16/597143  
DATED : January 5, 2021  
INVENTOR(S) : Yamato Niwa Page 1 of 2

It is certified that error appears in the above-identified patent and that said Letters Patent is hereby corrected as shown below:

In the Specification

In Column 1, Line(s) 64, after "in", delete ",".

In Column 1, Line(s) 67, delete "chanting" and insert --charging--, therefor.

In Column 3, Line(s) 5, after "time", delete "or" and insert --for--, therefor.

In Column 3, Line(s) 51, delete "extort al" and insert --external--, therefor.

In Column 3, Line(s) 58, delete "per" and insert --perform--, therefor.

In Column 5, Line(s) 43, delete "attic" and insert --of the--, therefor.

In Column 5, Line(s) 67, delete "ETC" and insert --PFC--, therefor.

In Column 6, Line(s) 14, delete "paver" and insert --power--, therefor.

In Column 6, Line(s) 50, before "port", delete "it" and insert --input/output--, therefor.

In Column 6, Line(s) 58 & 59, after "processed", delete ",".

In Column 7, Line(s) 49, delete "over" and insert --power--, therefor.

In Column 7, Line(s) 52, delete "259" and insert --250--, therefor.

In Column 8, Line(s) 9, after "area", delete ",".

In Column 8, Line(s) 19, delete "Configured" and insert --configured--, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,886,791 B2

In Column 8, Line(s) 42, after "been", delete ",".

In Column 9, Line(s) 8, after "object", delete ",".

In Column 9, Line(s) 12, delete "Configuration" and insert --configuration--, therefor.

In Column 9, Line(s) 41, delete "temporally" and insert --temporarily--, therefor.

In Column 10, Line(s) 41, delete "140" and insert --340--, therefor.

In Column 11, Line(s) 21, after "switch", delete ",".

In Column 12, Line(s) 51, after "than", delete ",".

In the Claims

In Column 16, Line(s) 10, Claim 6, after "during", delete ",".